US007380212B2

(12) United States Patent
Cody et al.

(10) Patent No.: US 7,380,212 B2
(45) Date of Patent: May 27, 2008

(54) DYNAMIC-TEMPLATE INCORPORATION OF DIGITAL IMAGES IN AN ELECTRONIC MAIL MESSAGE

(75) Inventors: Brian R. Cody, Seattle, WA (US); DeEtte M. Day, Seattle, WA (US); Tanuja Abhay Joshi, Redmond, WA (US); Christian Fortini, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 863 days.

(21) Appl. No.: 10/391,127

(22) Filed: Mar. 18, 2003

(65) Prior Publication Data

US 2004/0183830 A1    Sep. 23, 2004

(51) Int. Cl.
    *G06F 3/00* (2006.01)
(52) U.S. Cl. .................. 715/752; 715/520; 715/908
(58) Field of Classification Search ............ 715/752, 715/780, 908, 520, 748, 838
    See application file for complete search history.

(56) References Cited

U.S. PATENT DOCUMENTS

| 6,295,058 | B1* | 9/2001 | Hsu et al. ............... 715/769 |
| 6,401,131 | B1 | 6/2002 | Haverstock et al. |
| 6,493,733 | B1 | 12/2002 | Pollack et al. |
| 6,920,617 | B2* | 7/2005 | Nitta ...................... 715/745 |
| 6,965,926 | B1* | 11/2005 | Shapiro et al. ............ 709/219 |
| 2001/0050681 | A1* | 12/2001 | Keys et al. ............... 345/418 |
| 2002/0059322 | A1* | 5/2002 | Miyazaki et al. .......... 707/200 |
| 2002/0120701 | A1* | 8/2002 | Ohba ....................... 709/206 |
| 2003/0137545 | A1* | 7/2003 | Hoehn et al. .............. 345/838 |
| 2004/0032599 | A1* | 2/2004 | Atkins et al. .............. 358/1.9 |
| 2004/0177117 | A1* | 9/2004 | Huang ...................... 709/206 |
| 2005/0210413 | A1* | 9/2005 | Quek et al. ................ 715/838 |

OTHER PUBLICATIONS

M.Z. Markovic et al., "A MS-Windows Software Tool for Multimedia E-Mail in Local Area Networks," *Conference Publication*, No. 443, IPA97, Jul. 1997, pp. 15-17.

* cited by examiner

*Primary Examiner*—Kieu D. Vu
*Assistant Examiner*—Dennis G. Bonshock
(74) *Attorney, Agent, or Firm*—Shook, Hardy & Bacon LLP

(57) ABSTRACT

A method and system for execution in a graphical user interface environment are provided to incorporate digital image files in an email message. A template layout gallery is presented that includes a plurality of template layouts for digital image files for possible inclusion in the email message. When an indication is received that at least one digital image file is selected to be included in the email message and that one of the template layouts is to be applied to the at least one selected digital image file, the selected layout is created within the email message body according to the selected template. Prior to sending, the images are compressed.

19 Claims, 13 Drawing Sheets

```
<LayoutFile>
  <Category name="SimpleRecurrences" label="Recurring Photo Layouts">
    <Layout name="2" label="2 x 1 recurring, with right side textbox">
      <center>
        <TextBox LayoutId="title" style="width:90%;height:75px;">
          <center>
            <font size="+4">[Insert Title Here]</font>
          </center>
        </TextBox>
      </center>
      <Recurrence>
        <table style="display:inline;">
          <tr>
            <td>
              <Image style="width:2in;height:1in;" />
            </td>
            <td width="100%">
              <TextBox style="width:100%;height:1in;">[Insert Text Here]</TextBox>
            </td>
          </tr>
        </table>
      </Recurrence>
    </Layout>
  </Category>
</LayoutFile>
```

502 → `<LayoutFile>`
504 → `<font size="+4">`
506 → `<Recurrence>`
508 → `<Image style="width:2in;height:1in;" />`
510 → `<TextBox style="width:100%;height:1in;">`

FIG. 5.

DYNAMIC-TEMPLATE INCORPORATION OF DIGITAL IMAGES IN AN ELECTRONIC MAIL MESSAGE

CROSS-REFERENCE TO RELATED APPLICATIONS

None.

STATEMENT REGARDING FEDERALLY SPONSORED RESEARCH OR DEVELOPMENT

None.

TECHNICAL FIELD

In general, the present invention relates to computer software, and more particularly, to a method and system for incorporating digital images in an electronic mail (email) message utilizing a dynamic template.

BACKGROUND OF THE INVENTION

Personal computers (PCs) are increasingly being used for purposes far different from the standard word-processing and data-handling modes. PCs today are increasingly being used for communication purposes as well as the standard computing purposes. One such communication purpose involves communication via email, and specifically the incorporation of digital images in an email message.

Digital images can be stored on a computer and can take different paths into the computer. For example, digital cameras are now being widely used by consumers. In use, the digital cameras record and store digital images. These digital images can be moved from the more limited storage area of the camera to the storage area on a PC or other computing device. These storage areas are rapidly increasing in size, such that storage of a very large quantity of digital images is possible without affecting the operability of the computing device. As another example, standard photographs can be scanned into the computing device, thus converting the photograph into a digital image. Whatever the path into the computer, the user of the computer frequently desires to share the images with others.

Email offers a convenient and inexpensive method of communication. For example, a user can target a great number of people with a single outgoing message, in contrast to regular mail. In the past, however, the email context presented certain drawbacks in use. One method of sending digital images along with an email message involves sending the images as attachments. In this method, one or more individual images are attached to the email as additional files. To view the images, the person receiving the email message must double-click or otherwise open each attached file. To view any of the other images attached, the user must repeat the same procedure. In this method, then, people are required to open the files one at a time, and view them one at a time. This type of method is less than convenient and is not intuitive for novice computer users. Another problem with this method is the size of the attached files. Digital image files can be quite large. If they are not otherwise compressed in some fashion, the number of digital image files that can be attached is limited. This limitation is often imposed by the servers handling the email messages. Another method that can be used is to scroll through an email in the preview pane to view multiple picture attachments. This requires the use of the preview pane.

Another method used to include digital images within an email message is to copy the image into the message body. The main problem with this method is the formatting issues that arise. Using this method, any text that the sender includes is not associated with a particular image. Thus, if the sender includes text with a certain image, and then later moves that image within the email message body, the text will not move with the image unless the sender also separately moves the text. Moreover, including images of different sizes and orientations presents the receiver with an untidy and unpleasing view of the images. Also, any resizing of the images must be done on an image-by-image basis, making the process cumbersome and time-consuming. The basic problem with this method is that including images in-line within the message body is very cumbersome and results in an unpleasing view of the images. Any improvements in the view are cumbersome to effect. The file size is also large in this case as well, just as with the first method described above.

It would be desirable to provide to the computer user an opportunity to easily include and send digital images within the body of an email message. It would be desirable if this opportunity allowed the sender to easily format the presentation, including the layout, size, orientation and background effects, and to associate text with each image, if desired. It would also be desirable to compress the images for the sender. Therefore, there exists a need to improve the sender and receiver experience in the use of digital images within an email message.

BRIEF SUMMARY OF THE INVENTION

The present invention is directed to a method and computer application for execution in a graphical user interface environment. The method and system are used to facilitate presentation of image files within an email message. A layout gallery having a number of different image layout options is created and presented to the user upon receiving an indication of a desire to send images in the email message body. Upon receiving a selection from the user of a desired image layout, the layout and any selected images are incorporated into the message body, according to the selected layout. Until the message is sent, the images may be reordered, resized, edited, or rearranged if a different layout is selected. Any text associated with the image and input by the user is maintained with the image. Prior to sending the images are compressed.

Additional advantages and novel features of the invention will be set forth in the description which follows, and in part will become apparent to those skilled in the art upon examination of the following, or may be learned from practice of the invention.

BRIEF DESCRIPTION OF THE SEVERAL VIEWS OF THE DRAWINGS

The present invention is described in detail below with reference to the attached drawing figures, wherein:

FIG. 5 is an illustrative example of one layout file for possible use in the present invention.

DETAILED DESCRIPTION OF THE INVENTION

The present invention provides a method, system and user interface for use in sending email messages with digital images. The invention is used to allow computer users to easily add digital images to email messages using a provided dynamic layout, change the format as needed, and easily add and delete digital images prior to sending the message. The invention is also used to add effects to the presented digital images and to automatically compress the images upon sending. In use, a layout gallery is constructed. Each of the available layouts is presented to a user desiring to send digital images. Upon selection, the selected layout is displayed and the user may add any desired digital images to the layout. A backing data structure is maintained that associates effects and text with each image. The user can then add additional images and the layout is adjusted accordingly. Upon sending the email message, the images are compressed.

Having briefly described an embodiment of the present invention, an exemplary operating environment for the present invention is described below.

Exemplary Operating Environment

Figure 1:
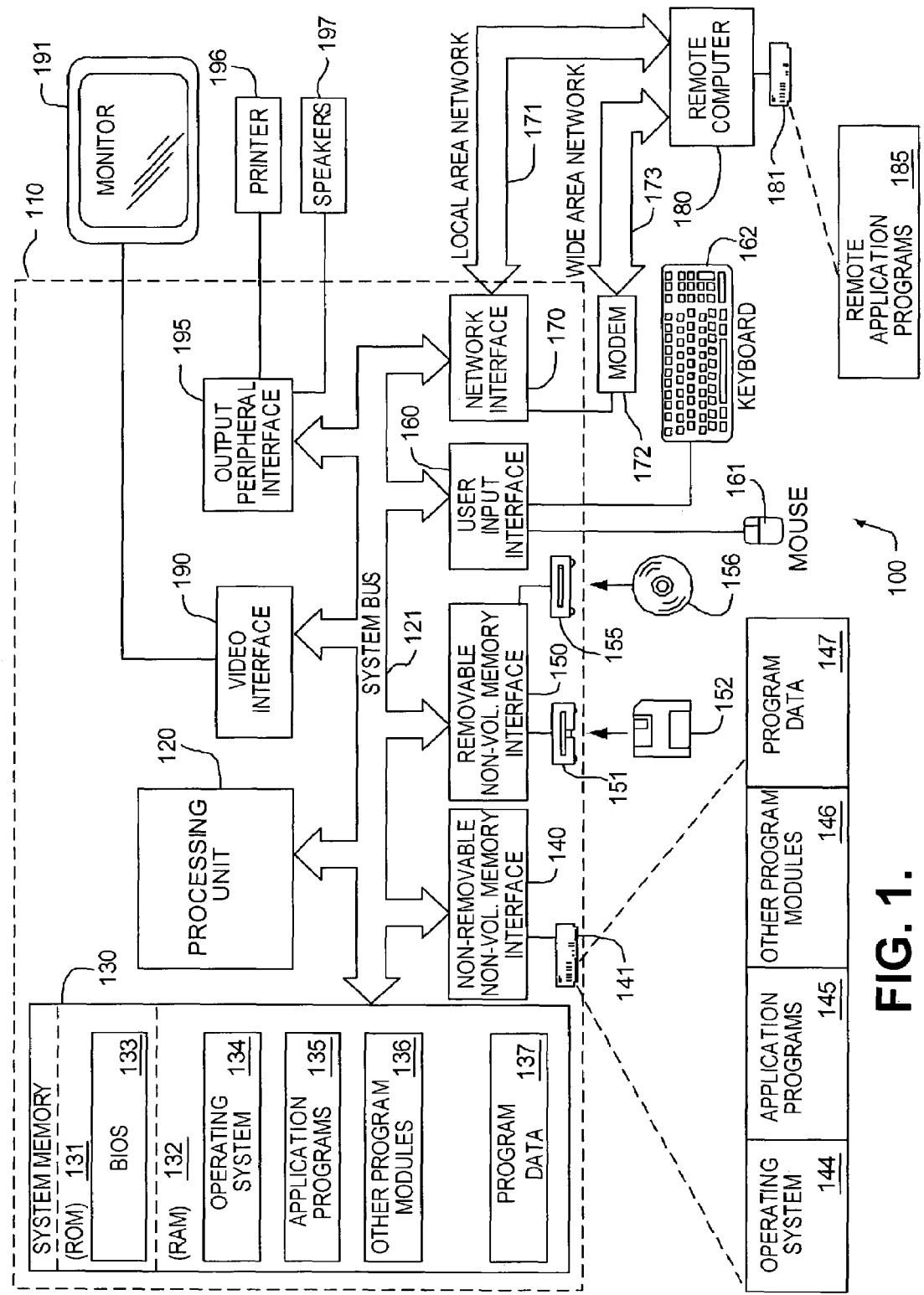
FIG. 1 is a block diagram of a computing system environment suitable for use in implementing the present invention.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user-input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

System and Method for Incorporating Images

Figure 2:
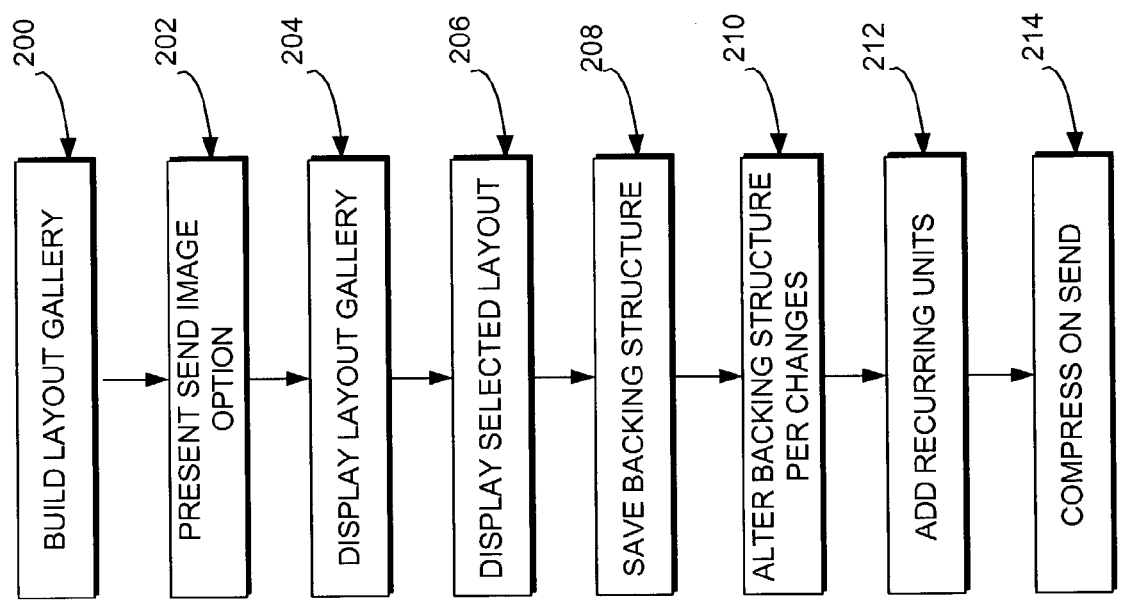
FIG. 2 is a flow chart illustrating certain aspects of the present invention.

As best seen in FIG. 2, a flow chart illustrating a method of the present invention is shown. The flow chart is illustrative of the implementation and user interface steps presented to the user of the computer 110 that allows the user to incorporate digital images within an email message.

The method begins at 200 with the construction of a layout gallery. The details of this construction will be provided below. Preferably, a number of different layouts are constructed. As an example, layouts may be constructed with different sizes of images, such as small pictures, medium pictures or large pictures. Along with the size of the images, the layouts can be constructed to associate text with each picture or not. For example, a layout can be constructed using small pictures with text associated with each picture and presented immediately under each picture. As can be understood, a great many different layouts can be constructed for use by the email sender. Certain layouts will be discussed, but the invention is not limited to any of the particular layouts presented or discussed herein. Additionally, it should be understood that additional layouts can be constructed and added to the layout gallery at a later time.

After the layout gallery is constructed, when a user is in a compose mode for sending an email message, an option is presented to the user to send photos or digital images, as shown at step 202. If the user selects the option to send photos, the layout gallery options are presented to the user at step 204. Preferably, each layout within the layout gallery is presented to the user. The method continues by monitoring for a user selected layout option, and displaying that layout upon selection, as shown at step 206. Initially, as is shown in more detail below, the selected layout is populated with any selected digital images. If the user has not yet selected any images, the displayed layout will initially show a template and will prompt the user to select images for population of the layout.

As the layout is populated with images, the invention saves a backing data structure regarding the layout, as shown at step 208. This backing data structure is described below and is used to effect any changes that the user desires prior to sending the email message. As an example, if the user initially selects a layout that has text boxes associated with each image, and the user has entered text, the text is saved in the backing structure even if the user later changes the layout to one without text boxes. This allows the text to "reappear" if the user again changes back to a layout with text boxes, saving the user from reentry of the text. Any changes in the order of pictures, text, or other image effects are saved in this backing data structure, as shown at step 210.

If the user desires to add further images, a recurring unit of the layout is added to the user interface, as shown at step 212. The recurring unit is defined by the layout that is selected by the user. As an example, a recurring unit for a layout with small pictures and text on the top of the image is one image box, sized for a small picture and a text box on top of the image box. Finally, as shown at step 214, prior to sending the email message, the images are compressed. More specifically, the images in the email message are compressed using a standard compression technology, such as jpeg compression.

Figure 3A:
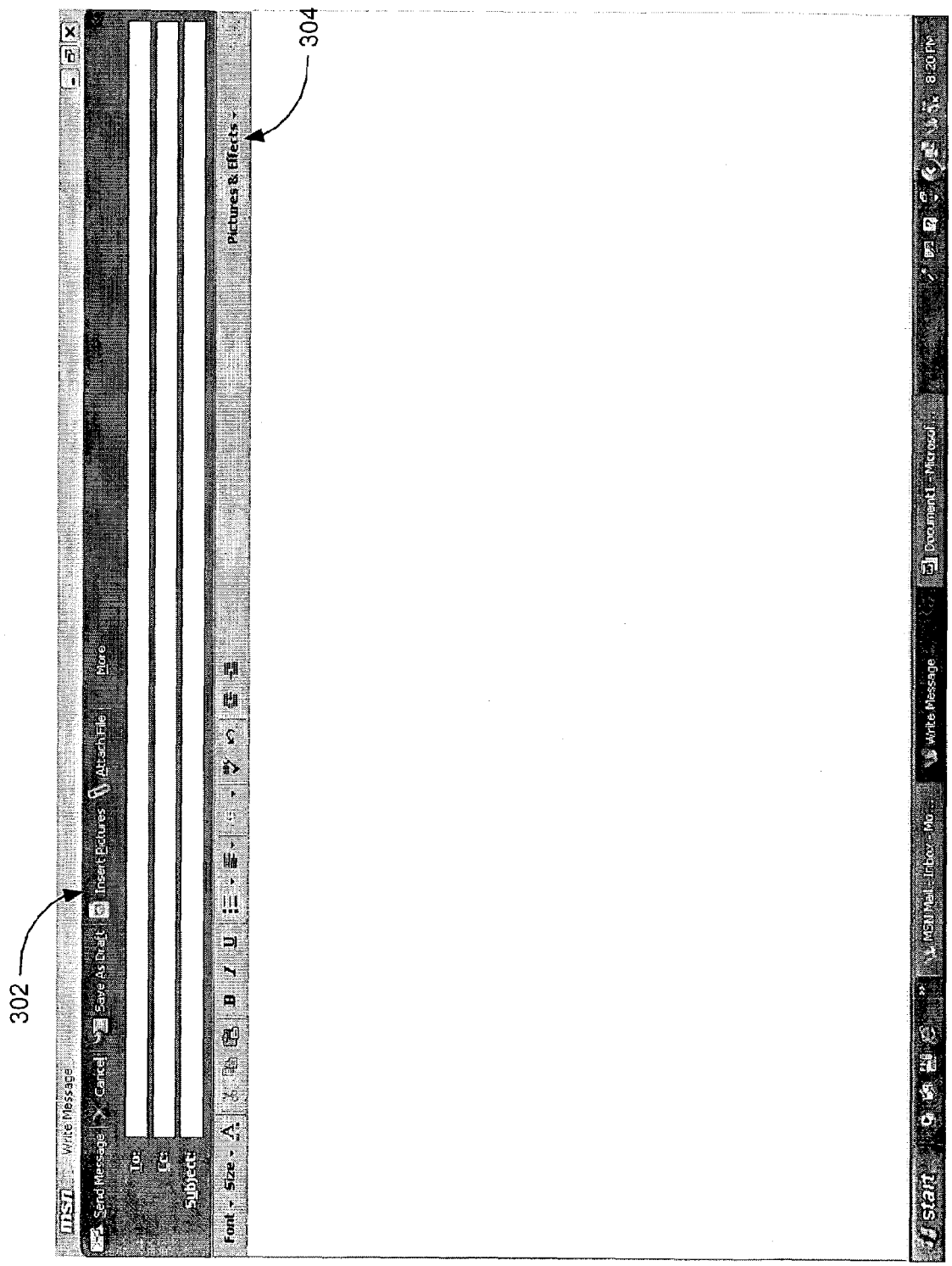
FIGS. 3A-3I are representative screen shots illustrating various aspects of the invention.
Figure 3B:
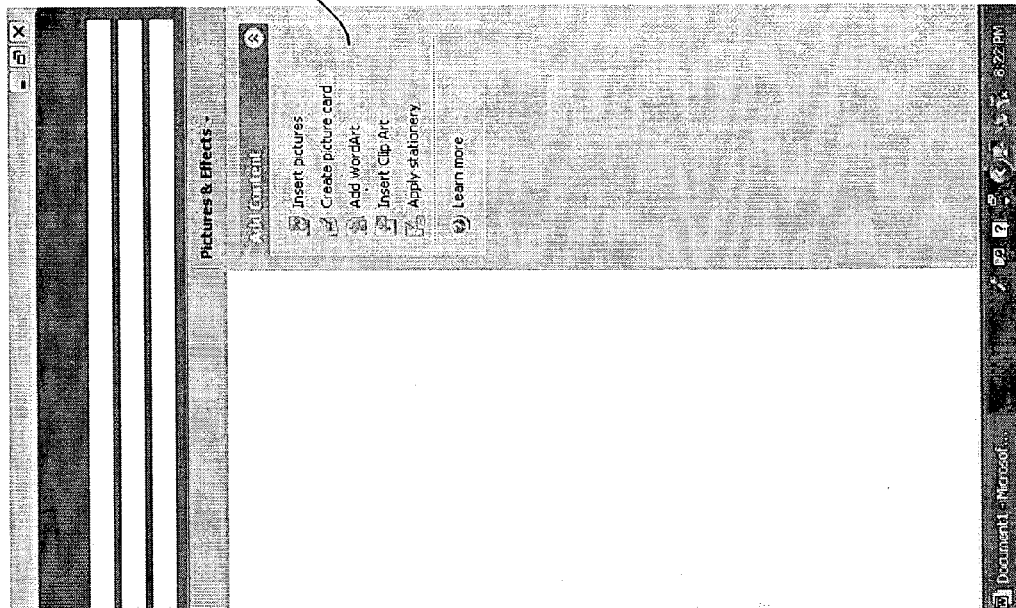
Figure 3B:
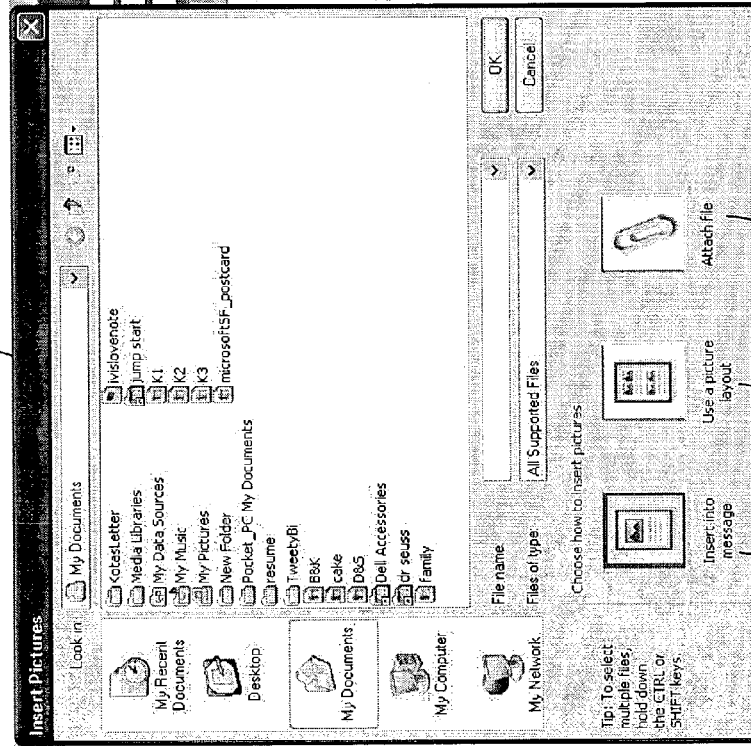
Figure 3C:
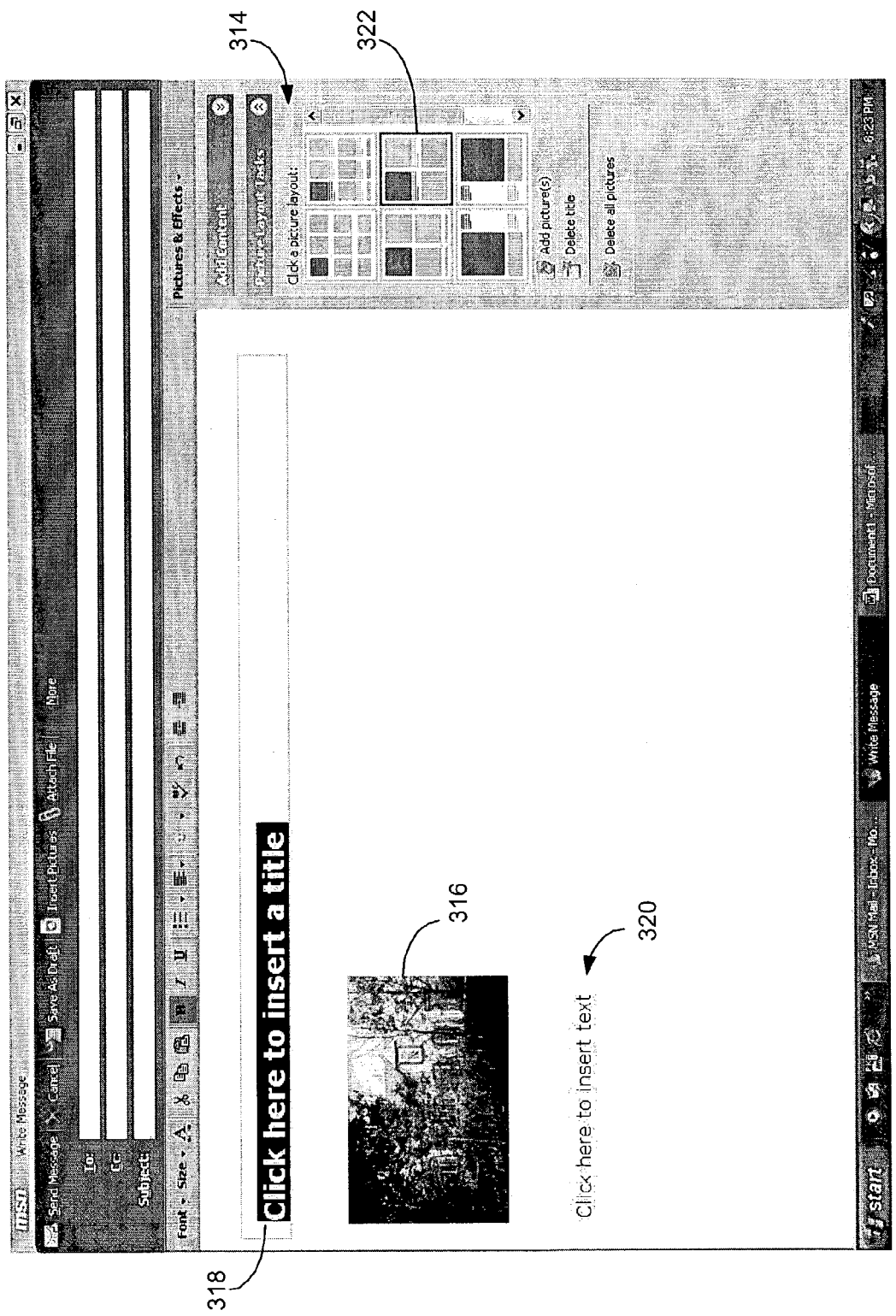

The screen shots shown in FIGS. 3A-3I illustrate the basic method described above. These screen shots are merely one implementation of the functionality of the invention, which is not limited to any particular user interface display as shown in FIGS. 3A-3I. FIG. 3A illustrates a user in the context of an emailing situation. As shown, the user is in the compose or write-message mode and is presented the option of sending "photos" or digital images. As shown in FIG. 3A, the user can select Insert Pictures button 302, or can select the Pictures and Effects drop-down menu 304. Selecting Insert Pictures results in the presentation of possible locations for images to be inserted, as shown by the window 306 in FIG. 3B. The drop-down menu 304 is also shown in expanded form in FIG. 3B. Selecting Insert pictures from drop-down menu 304 also results in a window similar to window 306. As shown in window 306, the user is presented options for inserting the pictures. Options "attach file" 308, "insert into message" 310 and "use a picture layout" 312 are shown in FIG. 3B. If the user selects "use a picture layout" 312, as shown in FIG. 3C, the template layout gallery 314 is displayed as part of the "Picture Layout Tasks." As shown in FIG. 3C, the user has also selected one image 316 to include in the email message. Immediately above the image is a title box 318 with instructions to the user on how to insert a title to the message. The title box 318 is a static or non-recurring portion of the layout and will be added only one time regardless of the number of images within the message. The image 316 is one portion of a recurring unit within the layout. The image 316 is sized to fit within an image box, which is explained in more-detail below. The image 316 is sized to fill the image box while maintaining the aspect ratio of the image. Another part of the recurring unit of the layout is the text box 320, shown here below the image 316. The text box 320 is an optional portion of the layout and is shown located below the image 316. The user is guided to insert text if they so desire.

Figure 3D:
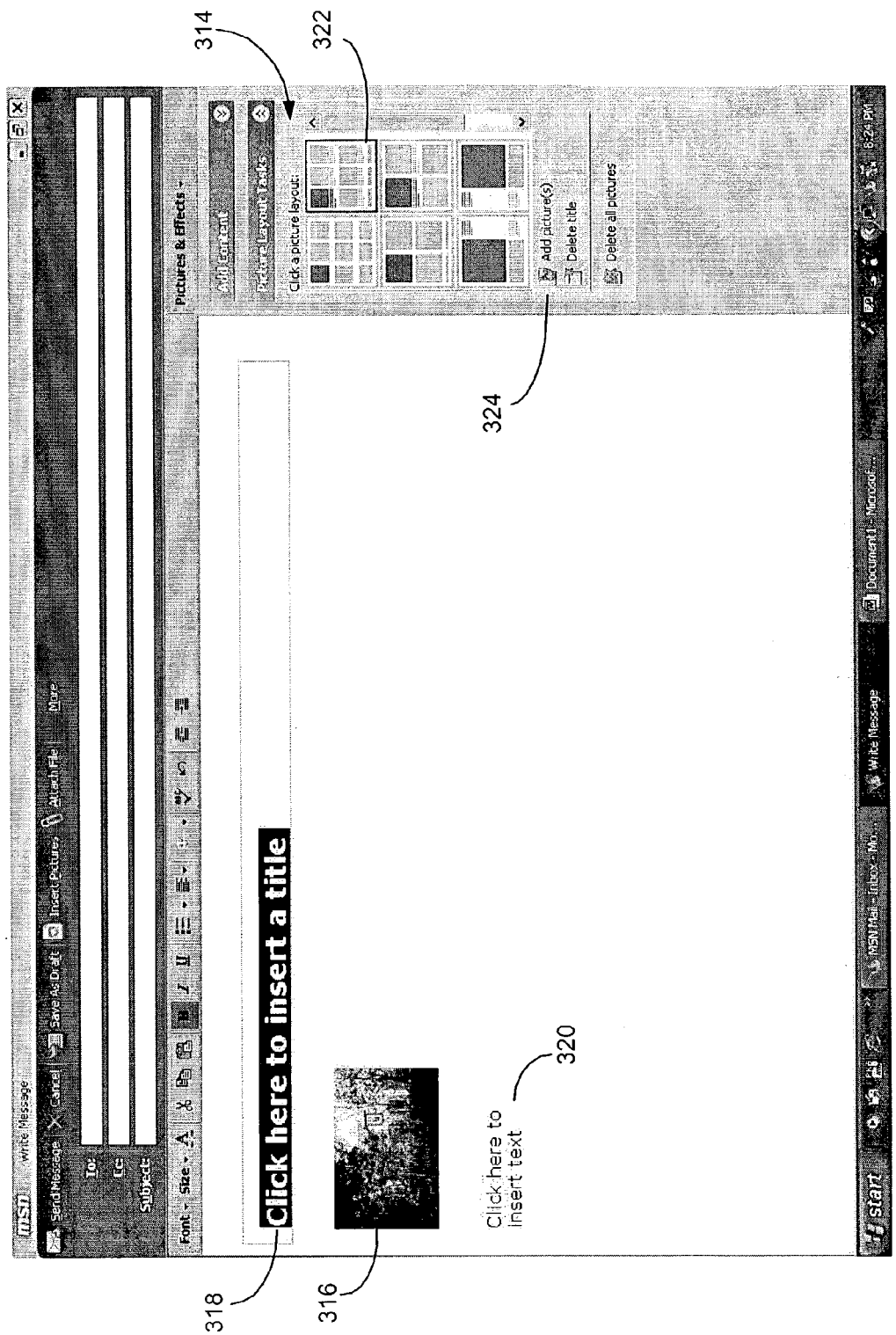

With continued reference to FIG. 3C, the layout gallery 314 is shown on the right-hand side of the screen shot. A graphical representation is shown for each of the available layouts within layout gallery 314. The slider bar on the right hand side of the gallery 314 indicates additional layouts are available for selection. As shown, there are six different layout displayed in the available gallery space. The size of the image is displayed, along with a representation of the inclusion or not of a text box and the positioning of any text box. For example, in the gallery 314 shown in FIG. 3C, two layouts of smaller pictures are shown in the top row, with two layouts of medium sized pictures in the second row and two layouts of larger sized pictures in the third row. Additionally, the upper-right hand layout with smaller pictures is represented as having a text box located below the images. The currently selected layout 322 has a highlight indicating its status as the currently selected layout. As shown, the selected layout 322 is one with medium-sized images and a text box located below the images. The user can alternate between layouts merely by selecting a different layout within the layout gallery 314. As an example, FIG. 3D illustrates a user switching from the medium sized images of FIG. 3C to a layout with smaller images and text below the image. Note that the currently selected layout 322 is now the upper right hand layout within gallery 314.

Figure 3E:
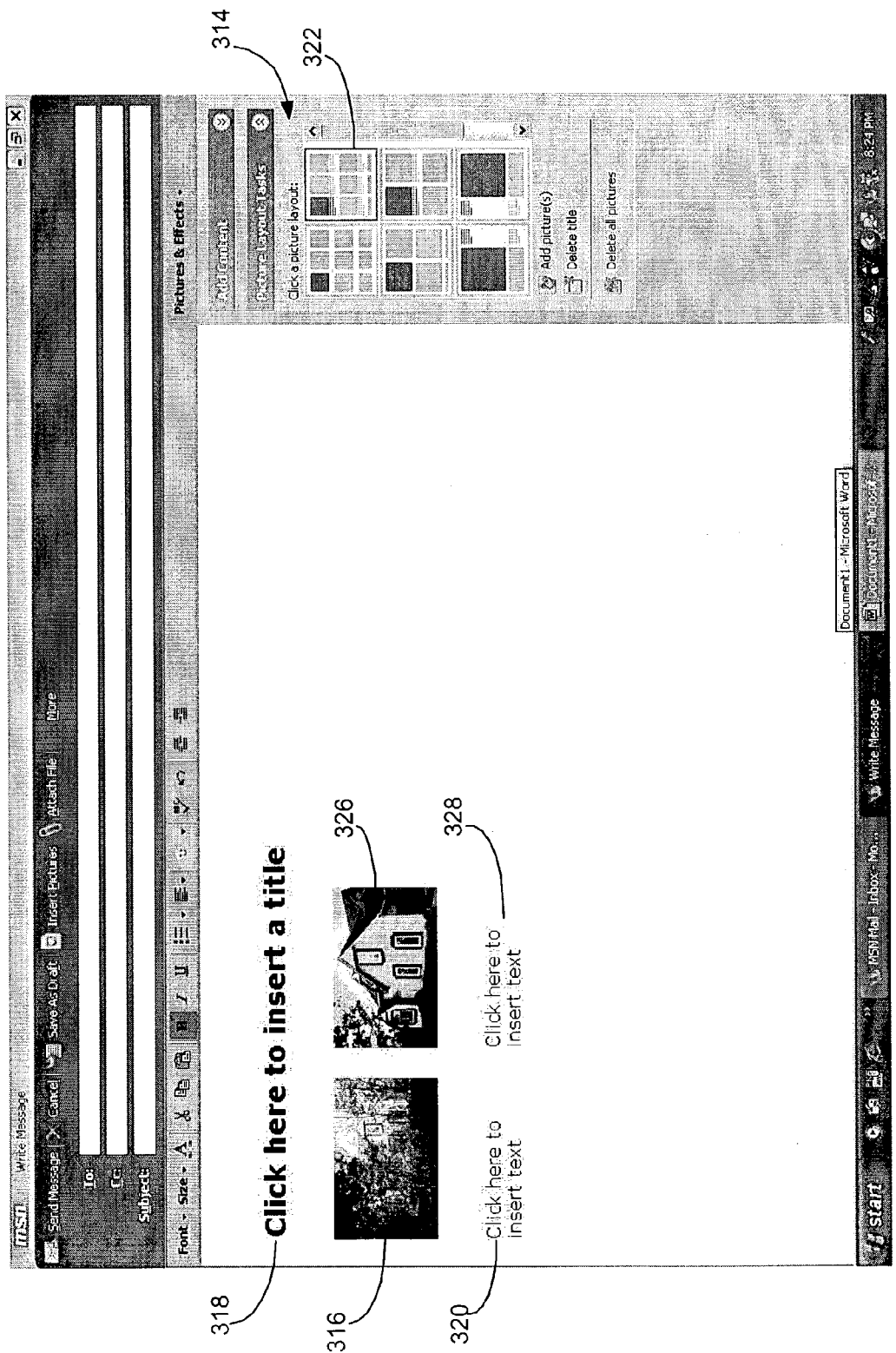

Immediately below the layout gallery 314 is an "Add picture(s)" option 324. Selecting this option presents the user with the possible locations from which to select an additional image, similar to that shown in FIG. 3B. Selecting another image inserts that image into the layout. As shown in FIG. 3E, the user has added an image. The image 326 is added, along with a corresponding text box 328. The image 326 and text box 328 are the recurring unit to the layout. It should be noted that the same title in box 318 is present, as the title is not a recurring unit. As discussed in more detail below, the number of images per row is based upon the available screen size on which the images are displayed. For example, more images per row are displayed, if images are available, on a large screen monitor as compared to a smaller display of a laptop computer. Some layouts, however, are designed to have a fixed number of images per row, regardless of the screen size.

Figure 3F:
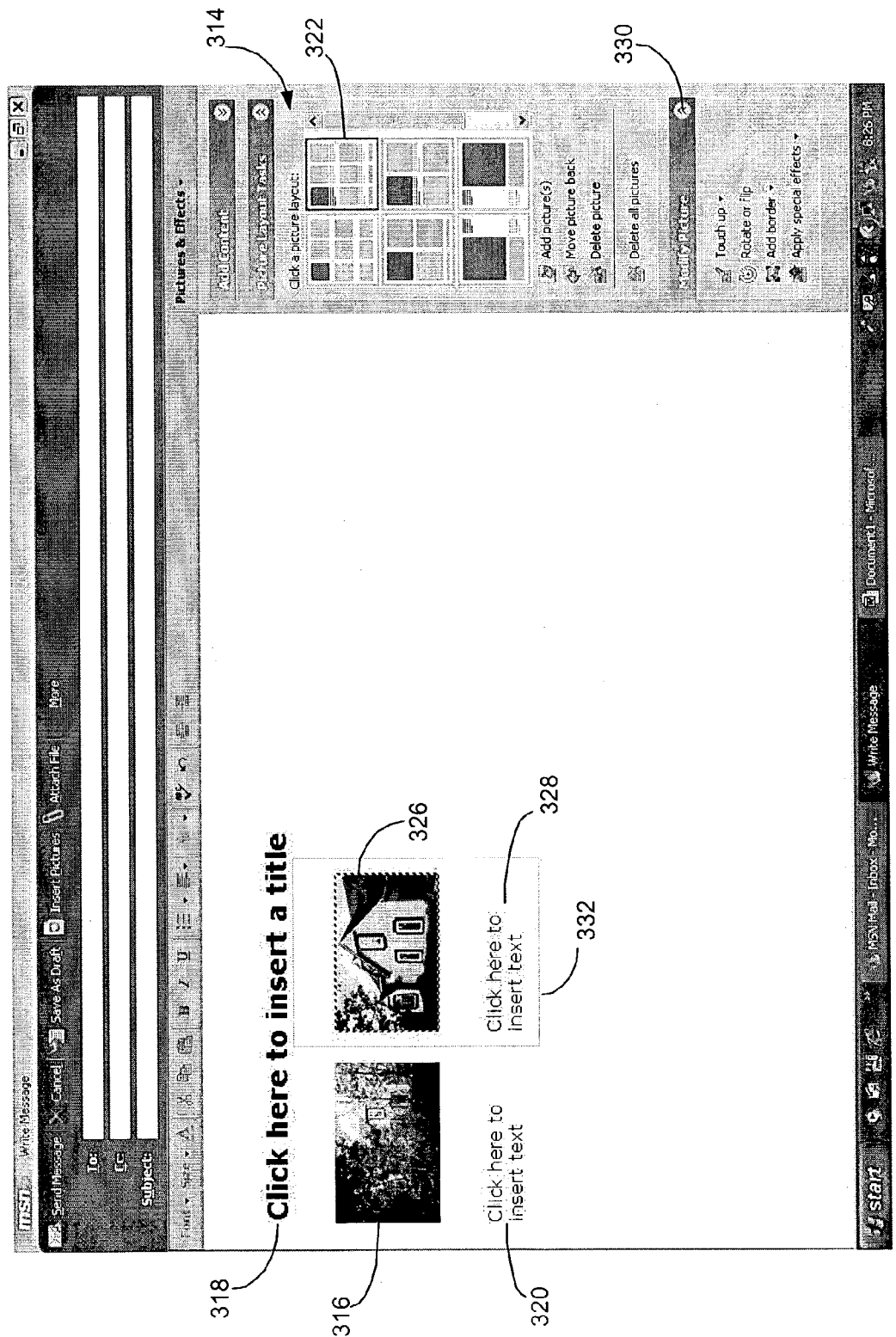

For each displayed image, a number of image modifications may be performed by the user, if desired. Turning to FIG. 3F, if the user selects a particular image, the "Modify Picture" drop-down menu 330 appears. In the example of FIG. 3F, the user has selected image 326, as indicated by the dotted line surrounding image 326. The highlighting box 332 indicates the recurring unit that is currently selected. The modification options presented under menu 330 are merely exemplary of picture modifications that a user may wish to utilize. As shown, the menu may include such options as "touch up," "rotate or flip," "add border," or "apply special effects." Possible options under the "touch up" category may include such things as removing red eye, cropping opportunities, brightness, contrast or color corrections. The "add border" category may, for example, allow the user to add edge effects to the image. The "apply special effects" category may, for example, allow a user to apply distortions to the image or add shadows to the image. It should be understood that other image effects and modifications can be provided under the modify picture menu, as would be understood by one of skill in the art. Moreover, the image effects may be applied to all of the images within the layout globally or on an image-by-image basis. For example, in the layout gallery, picture layouts having predefined effect may be available. This allows the user to create an appealing design quickly. For example, a layout could be presented that included a background stationery with blue tiles, circular borders applied to the pictures and a slight transparency applied to the pictures. The variety of global designs for the picture layouts is virtually limitless.

Figure 3G:
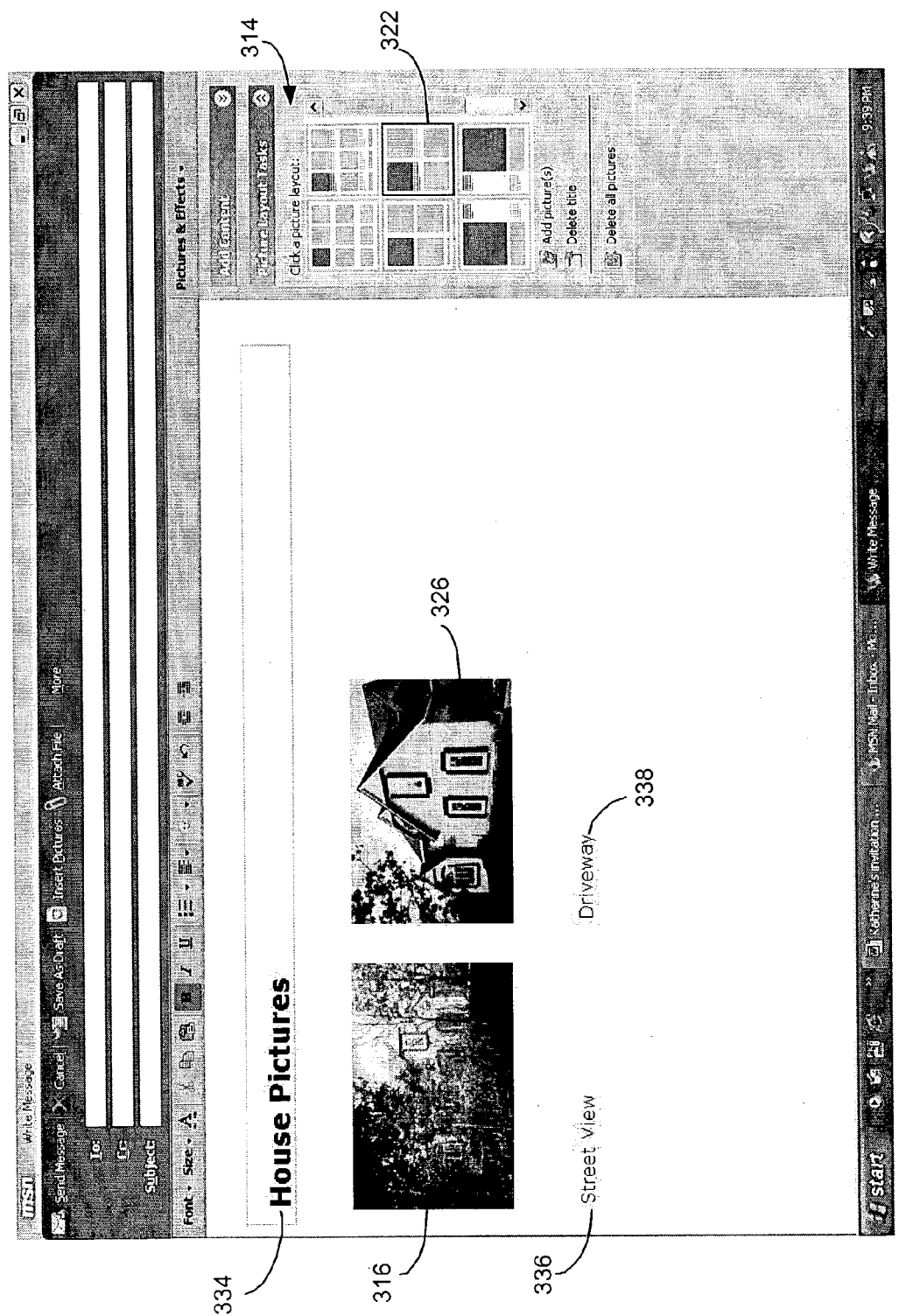
Figure 3H:
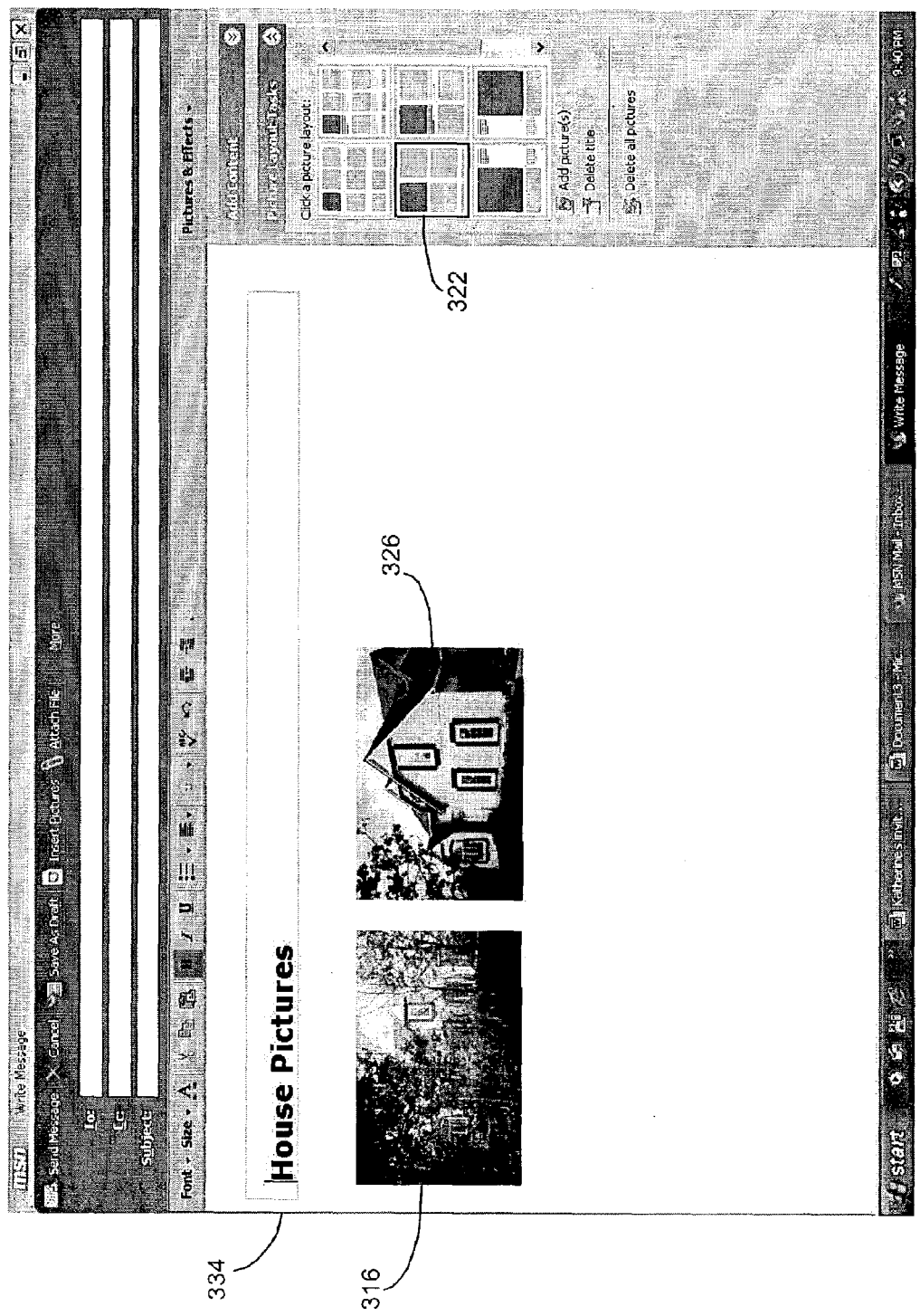

As stated above, the user is directed to insert a title in title box 318 or to insert text in text box 320, if a layout with text boxes has been selected. FIG. 3G illustrates the addition of a title 334 and image descriptions 336 and 338. The image descriptions 336 and 338 are associated with the particular images 316 and 326. The user can alter the arrangement of the images within the email message, simply by dragging and dropping the images to the newly desired location. As the user rearranges the images, the associated image descriptions will also follow. For example, if the user moved image 326 to the far left position, the image description 338 would follow it to the far left position. FIG. 3G also illustrates the user again switching from one layout to another. From FIG. 3F, the user has switched the selected layout 322 from a small pictures layout to a medium pictures layout in FIG. 3G. If the user now switches to a layout without a text box for the images, the previously entered text or image descriptions will not be displayed. The previously entered text or image descriptions will, however, continue to be saved, as is more fully described below. As an example, FIG. 3H shows the user switching from a medium sized pictures layout with text boxes to a medium sized pictures layout 322 without text boxes. The title 334 remains, but image descriptions 336 and 338 are not displayed.

Figure 3I:
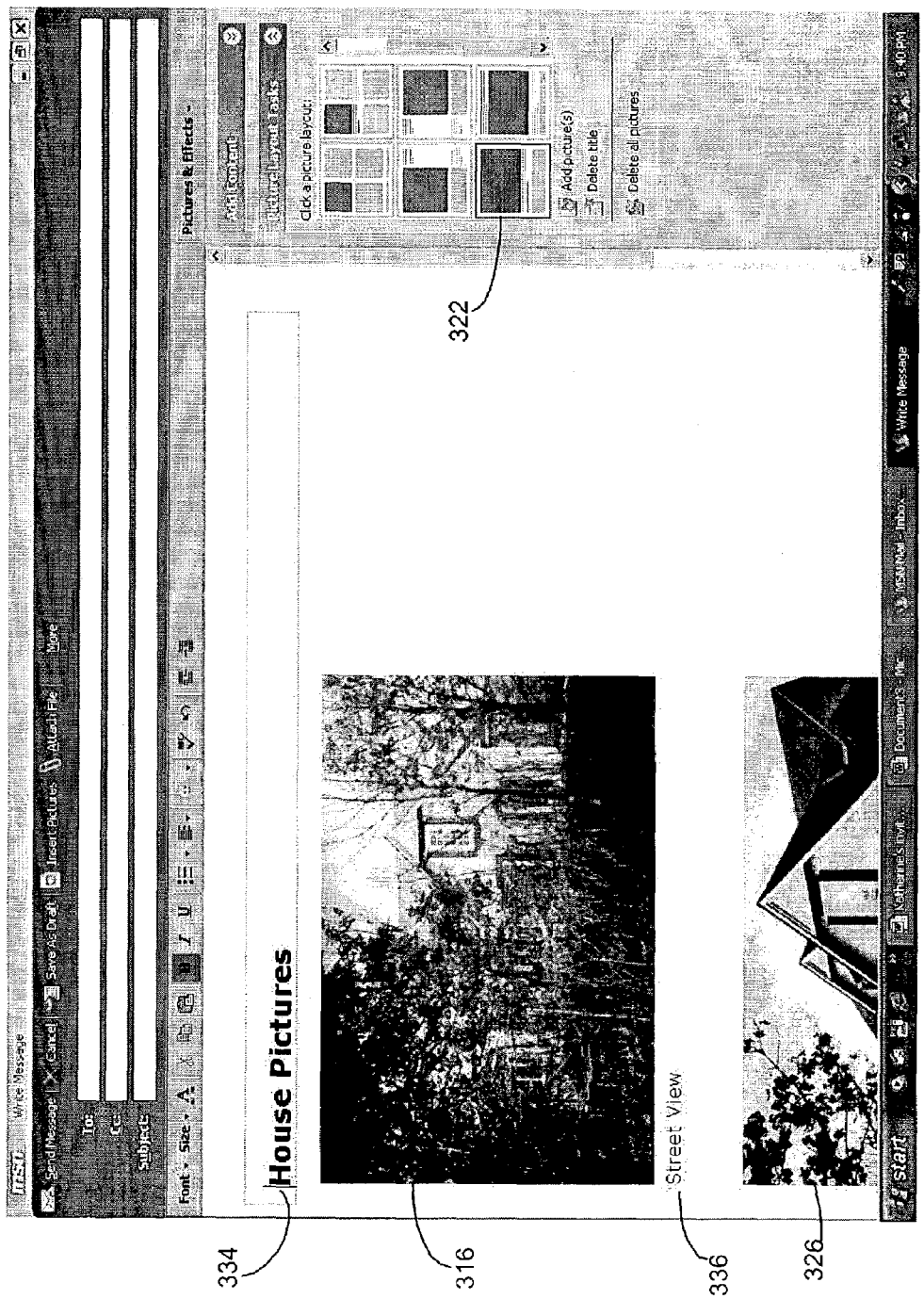

As discussed above, the number of images displayed per row is dependent on the size of the screen on which they are displayed. Typically, selecting a layout with smaller pictures will result in more pictures being displayed per row, whereas selecting a layout with large pictures will result in fewer pictures being displayed per row. As an example, if the user switches the selected layout 322 from the medium sized pictures of FIG. 3H to a selected layout 322 of larger pictures, as shown in FIG. 3I, only one picture per row will be displayed. FIG. 3I also illustrates a user re-selecting a layout with text boxes. Therefore, the image descriptor 336 is again displayed below its associated image 316. While each of the illustrated examples has shown the text boxes or image descriptors as being located below the images, the text boxes could also be located to the right or left of the images, or above the images, depending on the definition of the layouts. Additionally, the number of images per row is dependent on screen size only where multiple images per row is desired. Layouts are also available that have fixed image positioning. For example, a layout may also be available that depicts one image per row, no matter the screen size or resolution.

Figure 4:
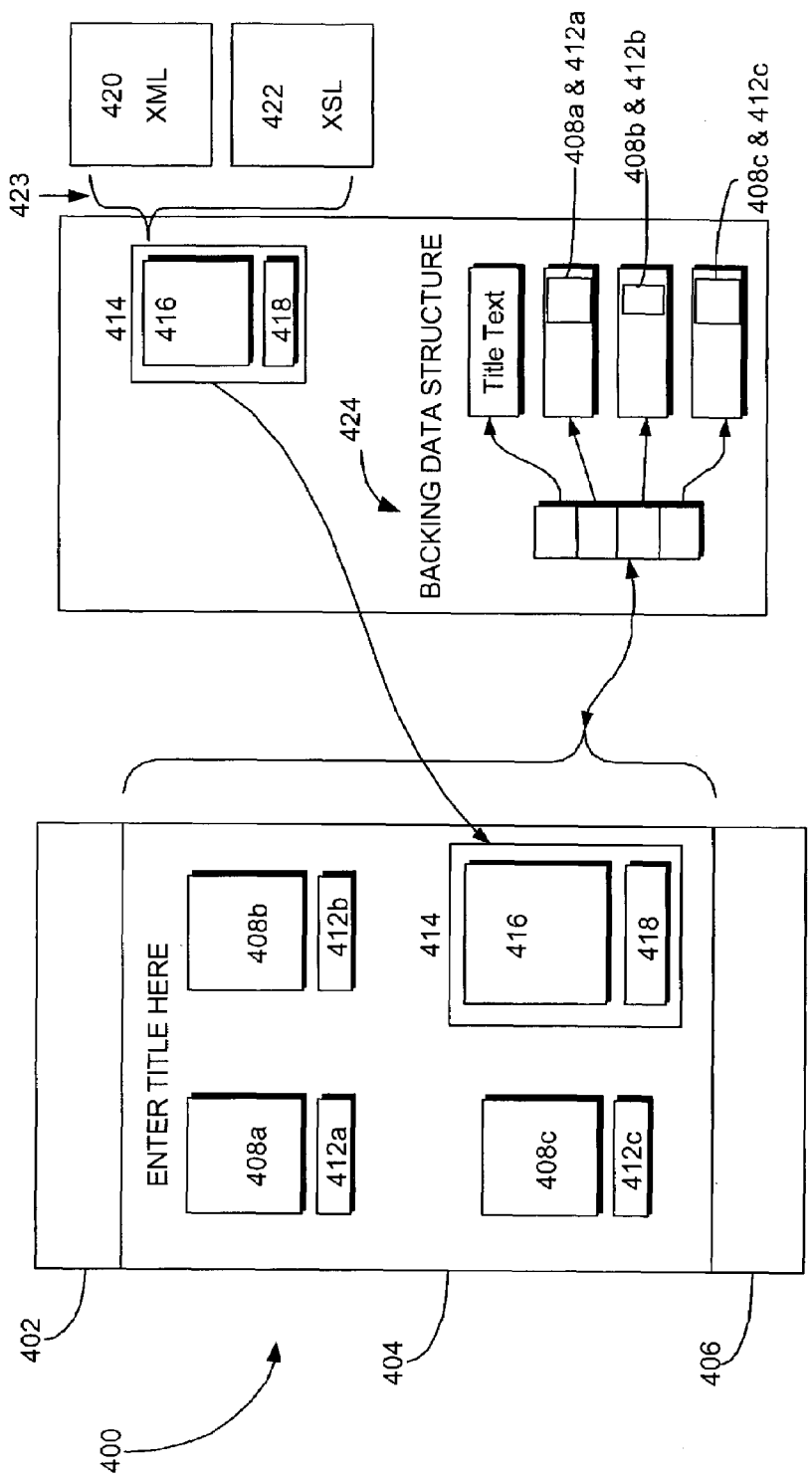
FIG. 4 is a schematic view of the underlying structure in one embodiment of the present invention.

The screen shots of FIGS. 3A-3I illustrate the functionality or use of the layout gallery and the incorporation of the images into the email message. FIG. 4 is a schematic diagram illustrating the underlying structure to achieve this functionality. As shown in FIG. 4, the email message body 400 is shown having a free-text area 402, a photo or image layout 404 and a free-text area 406. The free-text areas 402 and 406 are the conventional areas normally associated with the message body 400, and the layout 404 is one chosen from the layout gallery 314. In FIG. 4, the images within the layout 404 are all shown schematically as items 408a-408c, with a title box and corresponding text boxes labeled 412a-412c. A layout recurring unit 414 is shown having an image box 416 and a text box 418. The recurring unit 414 represents the location for the next image and associated text.

With continued reference to FIG. 4, the various templates defined within layout gallery 314 are shown schematically at 420. The layouts are defined and stored in extensible markup language (XML), and are more-fully described below. Along with the XML layout definitions 420 is an extensible stylesheet language (XSL) component 422. The XSL component transforms the XML into structured HTML that is then added to the message, as represented by the arrow 423. The entire image layout is memorialized with a backing data structure, represented generally at 424. The data structure 424 stores any title text, such as title 334. The data structure 424 also stores the images in their current selection order as 408a-408c. Any text, such as text boxes 412a-412c are also stored in the data structure and the text boxes are tied to the particular image 408 with which they are associated. Thus, if a user reorders an image on the screen, this is reflected and stored in the data structure 424. The data structure is used, along with the defined and selected layout, to properly render the images and text boxes on the display of the user when the layout is switched.

The layouts within the layout gallery 314 are defined in XML, although it should be understood that other languages could be used. XML behaves much like HTML, but with a few special purpose tags. The XSL component then transforms the XML tags into the structured HTML that is needed to render the layout on the display of the sender or receiver of the email message. The special purpose tags can include one or more file structure tags, component tags, template structure tags and template attribute tags. The file structure tags include a layoutfile tag, a category tag and a layout tag. The component tags include an image tag and a textbox tag. The template structure tags include at least a recurrence tag. Finally, the template attribute tags include a compression tag and a layoutID tag. These tags control the structure of the layout and are used to define such things as the size of the image box, whether text boxes are present, and if so, where the text boxes are located relative to the associated image box. Each tag is discussed briefly below, followed by an exemplary XML layout definition file.

The layoutfile tag is used to denote a file defining the layout gallery that is populated by the various layouts. The category tag is used to denote a grouping of layouts into one or more categories. For example, all layouts having two images per image box could be grouped into a category using the category tag. When a user switches from one layout to another within a category, the switch can be made more efficiently using the knowledge that the two layouts are within the same category. The layout tag defines the specific layout within the layout gallery. Each layout uses the image tag to define the image holder or box and the textbox tag to define the text box, if any. The recurrence tag defines the entire recurring unit, such as the image box and the text box. This information is used to determine what information is to be repeated and is used as the user adds images to the email message. The recurrence uses only the available visible space of the display, as opposed to being a hard-coded number of images per row. Each recurring unit is of a defined size and the recurring units are then rendered on the screen according the size of the screen. The compression tag is used if the layout or template designer desired to alter the standard compression that is used. Finally, the layoutID tag is used to control placement of particular images and textboxes during layout switching. The layoutID allows images and textboxes with recurrences to be named so that content from the backing data structure will only be filled into areas with matching names. This is particularly useful for layouts with more than one image or more than one text box per recurrence. It can also be used to enhance the filtering capabilities inherent in layout switching, such as what data to show and what data to hide.

FIG. 5 illustrates one example XML layout definition file. In FIG. 5, the layout file tag 502 defines the boundaries of the file for the layout gallery. In this example, for the sake of brevity, only one layout will be defined within the layout file. The layout defines a text box with the caption "[Insert Title Here]" along with the font size, as shown at 504. This title text box is not part of the recurring unit, which begins with the recurrence tag 506. The table style is "display inline," so that the images will fill the available screen space. The layout defines the image box at 508. The definition of the image box includes the width and height of the box. As shown at 510, the layout defines a text box with a defined width and height, along with the initial instruction to "Insert Text Here." The recurring unit can then be seen to be the image box and the associated text box. The file containing the XML definition is read when the "write message" or compose email message page is launched. All layouts defined in the file are then displayed in the layout gallery when the user indicates a desire to insert images to the email message. When the user selects to use the layout feature and at least one image, the title and one instance of the recurring unit is dropped into the email message body to begin populating the layout. If multiple images have been selected, the number of images is determined and that many recurring units are added to the layout with the selected images. It should be understood that the layout gallery file has as many layout files as there are layouts. These tags are not exhaustive and are not indented to narrow the scope of the present invention. Rather, these tags illustrate one of a myriad of ways of accomplishing the functionality described.

As can be understood, the method and system allow a user to easily share image files within an email context. The images are added directly to the body of the email in a predefined and easily modified layout. The layout presents to the receiver of the message a better viewing experience. Within the email message, prior to sending, the composer of the message can alter "on the fly" the images to be sent, the order and size of the images and the specific layout to be used.

The present invention has been described in relation to particular embodiments, which are intended in all respects to be illustrative rather than restrictive. Alternative embodiments will become apparent to those skilled in the art to which the present invention pertains without departing from its scope.

From the foregoing, it will be seen that this invention is one well adapted to attain all the ends and objects set forth above, together with other advantages which are obvious and inherent to the system and method. It will be understood that certain features and sub-combinations are of utility and may be employed without reference to other features and sub-combinations. This is contemplated and with the scope of the claims.

What is claimed is:

1. A computer-implemented method for execution in a graphical user interface environment to dynamically layout digital image files in an email message, comprising:

presenting on the graphical user interface a template layout gallery including a plurality of template layouts, each template layout defining one or more recurring units for possible inclusion of at least one digital image file in the email message, wherein defining comprises identifying a digital-image size from a plurality of digital-image sizes, identifying a text-box location from a plurality of possible text-box locations that provide the position of a text box in relation to the digital image, and directly associating the identified digital-image size and identified text-box location to form a common formatting;

receiving an indication that at least one digital image file is selected to be included in the email message;

receiving an indication that one of the template layouts is selected for inclusion of the at least one selected digital image file in the email message; and creating within the email message a layout according to the selected template layout by incorporating each of the at least one selected digital image file in the one or more recurring units, each recurring unit corresponding with one of the at least one selected digital image file and specifying the common formatting, as defined by the template layout, that directly associates a text box to each of the at least one selected digital image file such that each text box is commonly located, according to the identified text-box location, in relation to each of the associated at least one selected digital image, respectively, and adjusts the size of the at least one selected digital image file, according to the identified digital image size, and wherein the direct association of the text box and the at least one selected digital image file causes the text box to automatically adjust from a first location to a second location within the layout upon a user moving the at least one digital image file from the first location to the second location.

2. A computer-implemented method as recited in claim 1, wherein the template layouts within the template layout gallery includes at least one template layout defining one or more recurring units specifying a common formatting, wherein the common formatting comprises a digital-image-size attribute and a text-box-location attribute that provides the position of the text box in relation to the associated at least one selected digital image file.

3. A computer-implemented method as recited in claim 1, further comprising first creating the template layout gallery by defining the plurality of layouts for images within the email message.

4. A computer-implemented method as recited in claim 3, wherein, prior to the presenting step, the method comprises:
monitoring for a user indication of the desire to send image files in the email message; and
upon receiving a user indication of the desire to send image files, presenting the template layout gallery on the graphical user interface.

5. A computer-implemented method as recited in claim 1, further comprising, upon incorporating the image into the email message, presenting image editing options to the user on the graphical user interface.

6. A computer-implemented method as recited in claim 1, further comprising monitoring for a user change of desired image layout, and upon receiving the user change, redisplaying the selected images according to the user change of the desired image layout.

7. A computer system having a processor, a memory and an operating environment, the computer system operable to execute the method as recited in claim.

8. A computer storage medium having a tangible component embodying computer-usable instructions for executing the method of claim 1.

9. A computer-implemented method as recited in claim 1, further comprising:
receiving an indication that another of the template layouts is selected for inclusion of the at least one selected digital image file in the email message, wherein the other template layout defining one or more recurring units specifying another common formatting; and
automatically applying the other common formatting to the each of the at least one selected digital image file.

10. A computer-implemented method as recited in claim 1, further comprising:
receiving an indication to apply image effects to the at least one selected digital image file in the email message; and automatically applying the image effects to the each of the at least one selected digital image file.

11. A computer-implemented method as recited in claim 1, further comprising automatically providing a single recurring unit upon receiving an indication that an additional digital image file is selected to be included in the email message.

12. In a computer-implemented email application, an image layout manager implemented in software stored on a computer storage medium having a tangible component, the image layout manager comprising:
a user interface presenting an image layout gallery upon receiving an indication of a desire to send images within the email message, the image layout gallery including a plurality of image template layouts, each image template layout defining one or more recurring units for possible inclusion of images in the email message, wherein defining comprises identifying an image size from a plurality of image sizes, identifying a text-box location from a plurality of possible text-box locations that provide the position of caption text in relation to the images, and directly associating the identified image size and identified text-box location to form a common formatting, wherein the indication to send images comprises:
(1) receiving an indication that images are selected to be included in the email message; and
(2) receiving an indication that one of the plurality of image template layouts is selected for inclusion of the selected image files in the email message; and
a backing data structure to create within the email message a layout according to the selected image template layout by incorporating each of the selected images in the one or more recurring units, and to store the caption text corresponding to the images within one or more recurring units that specify the common formatting for the images selected by the user for sending, wherein, upon selecting a common formatting that hides the caption text, persistently storing the caption text in association with the corresponding images, wherein the caption text reappears upon selecting a common formatting that displays images with corresponding caption text,
wherein each recurring unit corresponds with one of the images, as defined by the template layout that directly associates the caption text to each of the selected images such that each caption text is commonly located, according to the identified test-box location, in relation to each of the associated selected images, respectively, and such that the size of the selected images is adjusted according to the identified image size, and
wherein the direct association of the caption text and the selected image causes the caption text to automatically adjust from a first location to a second location within the layout upon a user moving the image from the first location to the second location.

13. An image layout manager as recited in claim 12, further comprising a compression agent to compress any images within the email message prior to sending the email message.

14. An email image program embodied on a computer storage medium having a tangible component, the email image program comprising instructions for:
presenting on a graphical user interface a template layout gallery for images within an email message, the layout gallery including a plurality of template layouts, each template layout defining one or more recurring units for possible inclusion of at least one digital image file in the email message, wherein defining comprises identifying a digital-image size from a plurality of digital-image sizes, identifying a text-box location from a plurality of possible text-box locations that provide the position of a text box in relation to the digital image, and directly associating the identified digital-image size and identified text-box location to form a single formatting;

receiving an indication that one of the template layouts is to be applied;

receiving an indication that the at least one digital image file is selected to be included in the email message; and creating within the email message a layout according to the selected template layout by incorporating each of the at least one selected digital image file in the one or more recurring units, each recurring unit corresponding with one of the at least one selected digital image file and specifying the single formatting, as defined by the template layout that directly associates a text box to each of the at least one selected digital image file such that each text box is commonly located in relation to each of the associated at least one selected digital image, respectively, and wherein the direct association of the text box and the at least one selected digital image file causes the text box to automatically adjust from a first location to a second location within the layout upon a user moving the at least one digital image file from the first location to the second location.

15. An email image program as recited in claim 14 further comprising instructions for:

monitoring for a user selection of additional image files to be included in the email message; and incorporating the user-selected additional image files into the email message by adding additional recurring units for the user-selected additional image files.

16. An email image program as recited in claim 15, further comprising instructions for:

compressing, prior to sending the message, the user selected image files; and sending the email message.

17. A user interface for use in an email context and embodied on a computer storage medium having a tangible component, the user interface comprising:

a message body area; and a template layout gallery including a plurality of possible image layouts, displayed upon receiving an indication from a user a desire to include images within the message body, wherein each possible image layout defines one or more recurring units that specify a common formatting of the images, wherein defining each of the one or more recurring units comprises selecting a digital-image size from a plurality of digital-image sizes, selecting a text-box location from a plurality of possible text-box locations that provide the position of a text box in relation to the digital image, and directly associating the identified digital-image size and identified text-box location to form the common formatting, wherein the indication to include images in the message body comprises:

(1) receiving an indication that images are selected to be included in the email message; and (2) receiving an indication that one of the plurality of possible image layouts is selected for inclusion of the selected image files in the email message, wherein a layout is created within the email message a according to the selected possible image layouts by incorporating each of the selected images in the one or more recurring units, wherein each recurring unit corresponds with each selected digital image file and specifying the common formatting, as defined by the template layout that directly associates each text box to each of the selected digital image files such that each text box is commonly located in relation to each of the associated selected digital images, respectively, and such that the size of the selected digital image file is adjusted according to the identified digital-image size, and wherein the direct association of the text box and the selected digital image files causes the text box to automatically adjust from a location to a second location within the layout upon a user moving the digital image file from the first location to the second location.

18. A user interface as recited in claim 17, wherein the possible image layouts within the template layout gallery include at least one image layout defining the one or more recurring units for display of a first size image on the graphical user interface and at least one image layout defining one or more recurring units for display of a second size image on the graphical user interface.

19. A user interface as recited in claim 18, wherein each layout within the layout gallery is graphically represented.

* * * * *